United States Patent [19]

Stafford

[11] 4,155,670
[45] May 22, 1979

[54] BALL AND SOCKET SWIVEL WITH CONDUIT THERETHROUGH AND TORQUE TRANSFER CAPABILITY

[75] Inventor: Donald C. Stafford, Hinsdale, Ill.
[73] Assignee: Chicago Bridge & Iron Company, Oak Brook, Ill.
[21] Appl. No.: 891,463
[22] Filed: Mar. 29, 1978
[51] Int. Cl.² .................... E02D 21/00; F16L 21/00
[52] U.S. Cl. .................................. 405/202; 285/264; 403/114
[58] Field of Search ................. 61/95, 104; 285/264, 285/261; 137/236; 9/8 P; 114/293; 405/202; 403/114, 116, 123

[56] References Cited
U.S. PATENT DOCUMENTS

| | | | |
|---|---|---|---|
| 2,266,383 | 12/1941 | Quintrell | 285/264 X |
| 3,663,043 | 5/1972 | Walton | 285/264 X |
| 4,048,944 | 9/1977 | Corgnet | 61/95 X |

Primary Examiner—Jacob Shapiro
Attorney, Agent, or Firm—Merriam, Marshall & Bicknell

[57] ABSTRACT

A ball joined to a first element, a hole through the ball and first element, a socket, having a spheroidal internal surface, joined to a second element, a hole through the socket and second element, said socket containing the ball in mating and nesting arrangement with the hole in the ball communicating with the hole in the socket, one of the ball and the socket containing at least one cam slot extending along a line of longitude, a cam follower having an axle joined to one of the ball and the socket at the equator and extending into the slot in the other one, and said ball and socket being rotatable relative to each other around only two of three orthogonal axes intersecting at a point in the radial center of the ball.

10 Claims, 6 Drawing Figures

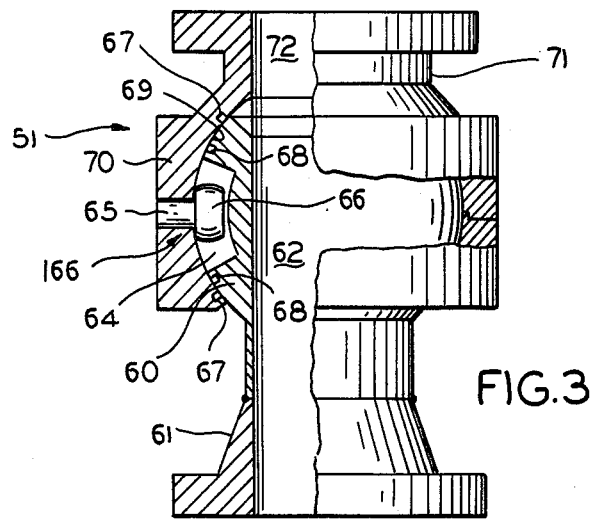
FIG.3
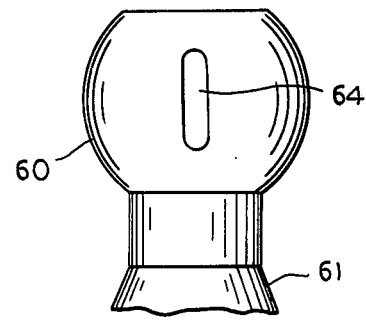
FIG.4
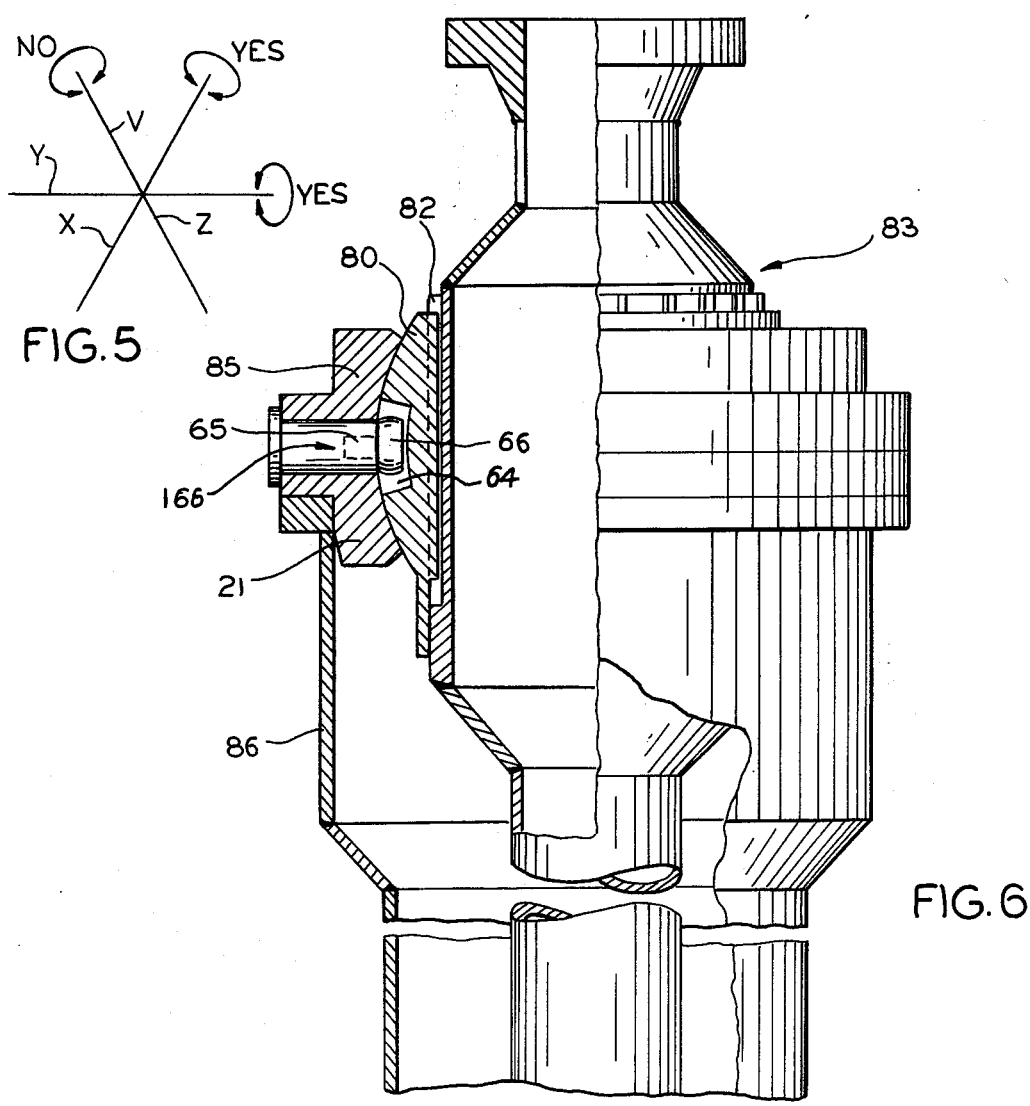
FIG.5
FIG.6

BALL AND SOCKET SWIVEL WITH CONDUIT THERETHROUGH AND TORQUE TRANSFER CAPABILITY

This invention relates to universal joints. More particularly, this invention is concerned with a ball and socket joint with torque transfer capability and having a conduit therethrough through which a fluid can flow or a pipe or other structure can extend or be passed through. The invention is also concerned with the use of such a ball and socket alone, or within another such joint, as for example in offshore oil producing structures.

Ball and socket type universal joints have been widely used for many years in various types of machinery and apparatus to articulately join one element to another element. These joints can employ a ball and socket with continuous uninterrupted mating or nesting surfaces when only a mechanical capability is sought. However, a conduit or hole is provided in both the ball and the socket when it is necessary or desirable to pass a rod, cable or the like through the joint or when the joint is to be used as a fluid swivel through which a fluid is to flow. While ball and socket joints of these types are highly useful for many purposes, it is sometimes desirable, and at times essential, that the ball and socket joint be limited in its action to rotate about only two out of three orthogonal axes. To prevent rotation of the ball relative to the socket about one axis a torque transfer means must be employed in combination with the ball and socket.

One present field greatly interested in ball and socket joints of the described types is in apparatus used offshore for oil production, processing and transfer, and for ship mooring. For example, offshore towers which are supported by the sea floor are used for oil exploration and production, for mooring ships and for other purposes. Although such towers can be made stationary, it is sometimes advantageous for the tower to be supported at its lower end through a universal joint connected to a base securely positioned on the sea floor. While guide lines can be used to maintain the tower upright, it is generally more suitable to make at least the upper part of the tower buoyant so that it will always return to an upright position even if tilted, such as 15° from perpendicular, by wind, sea currents and waves.

While a Cardan universal joint can be used to articulately connect the base to the tower bottom, this type of universal joint is not inherently as good a load bearing mechanism as a ball and socket type joint. U.S. Pat. Nos. 4,058,137; 4,048,944; 3,720,066; 3,708,985; 3,667,239; 3,572,408; and 2,988,144 show ball and socket joints on offshore structures. Some of these patents show joints with a conduit or passage extending through both the ball and socket for fluid flow or for insertion of a separate pipe, including one with a second ball and socket joint centrally positioned in a first ball and socket joint (U.S. Pat. No. 4,048,944; FIG. 2). U.S. Pat. Nos. 3,735,597 (Guy) and 3,614,869 (Flory et al.) show ball and socket supported offshore towers with what are said to be torque elements which prevent rotation about a vertical axis. The mechanism of the Flory et al. patent is insufficiently described to know how it works. The system of the Guy patent is exterior of the ball and socket support, is subject to environmental damage, and lacks precise torque control. Fowler U.S. Pat. No. 3,732,923 discloses an underwater flowline having a ball and socket connection (FIG. 9B) with torque transfer capability provided by radial keys and slots which keep the ball from rotating axially of the pipe relative to the socket. The keys and slots are undesirably in direct contact with any fluid which goes through the flow line.

According to one aspect of the subject invention, there is provided, in combination, a ball joined to a first element, a hole through the ball and first element, a socket having a spheroidal internal surface joined to a second element, a hole through the socket and second element, said socket containing the ball in mating and nesting arrangement with the spheroidal internal surface and with the hole in the ball communicating with the hole in the socket, one of the ball and the socket containing at least one cam slot extending along a line of longitude, a cam follower having an axle joined to one of the ball and the socket at the equator thereof and extending into the slot in the other one, and said ball and socket being rotatable relative to each other around only two of three orthogonal axes intersecting at a point in the radial center of the ball. The axle which projects into the slot acts as a means by which torque can be applied from the ball to the socket or from the socket to the ball, and it prevents rotation about one axis without interfering with rotation of the ball and socket about the other two axes which intersect at a point and which axes are located in a plane. All three axes are, of course, orthogonal.

The hole in the socket and the hole in the ball are positioned and sized so that together they form a conduit which communicates with suitable conduits or bores in the first and second elements so that fluid may flow through the resulting passage, or a pipe, cable or similar member can extend or pass through the joint.

Since the ball and socket joint is rotatable about two axes, it is sometimes desirable to make one of the holes in the ball and socket larger than the other so that the conduit radial clearance is not severely restricted by rotation of the ball relative to the socket out of axial arrangement to each other.

An advantage of the ball and socket joint provided by this invention is that the axle and slot are out of contact with the environment exterior of the joint as well as inside of the hole or conduit extending therethrough. This serves to protect the joint against adverse conditions.

Although it is not essential, it is quite often desirable for applications of the described ball and socket joint for the slot to extend an equal distance on each side of an equator of the ball or socket containing the same.

The slot can be in the socket and the cam follower axle can be joined to the ball. Alternatively, the slot can be located in the ball and the cam follower axle can be joined to the socket. Although only a single cam follower and slot are needed for the described combination, it is generally advisable to use at least two such torque transferring mechanisms for greater strength. Thus, two slots can be used on opposite sides of the ball or the socket, with the cam follower axle being located in the ball or socket opposite each slot. In addition, when two such mechanisms are used, they can be arranged so that one side of the ball contains a slot and the other side of the ball contains a cam follower axle. The socket may then contain a cam follower axle opposite the slot in the ball, and it can contain a slot opposite the cam follower axle in the ball. In very large ball and socket structures, it is feasible to employ more than two slot and cam follower mechanisms. Thus, four such mechanisms can be equally spaced around the ball and socket.

The width of each slot should be slightly greater than the diameter of the axle which extends therein, and this assumes that the axle contains no supplemental bearing means. Although a naked axle or shaft may be used in combination with the slot to get the desired torque transmitting action, it is highly beneficial to provide a roller on the axle so that it can roll along the opposing walls of the slot. The use of a roller reduces friction and wear and prolongs the life of the ball and socket joint. The diameter of the roller is made slightly smaller than the slot width between the slot walls to minimize play between the elements when torque is applied. It is further advisable to have a crown surface on the roller to obtain a more evenly distributed contact between the roller and the opposing equally spaced apart parallel walls of the slot in which the roller rides when the ball and socket rotate relative to each other in two out of the three axes.

In a further embodiment of the invention, a ball and socket joint according to the invention can be centrally positioned within another ball and socket joint which functions as an articulated high capacity bearing. The internal ball and socket joint can be part of a fluid transport line while the second joint can support an offshore tower.

Another embodiment of the invention provided herewith has a pipe means or pipe fitting splined into the hole in the ball so that a pipe which extends through the fitting can be displaced axial to the hole.

The invention will be described further in conjunction with the attached drawings, in which:

FIG. 3 is an elevational partial sectional view of the ball and socket joint inside of the ball and socket joint supporting the tower;

FIG. 4 is an elevational view of the ball in the joint of FIG. 3 and shows the longitudinal slot on one side;

FIG. 5 is a schematic drawing illustrating how the socket in the joint of FIG. 3 can rotate about two horizontal orthogonal axes but cannot rotate about the third and vertical axis;

FIG. 6 is an elevational partial sectional view of a ball and socket joint according to the invention having a splined pipe fitting in the ball.

So far as is practical the same elements or parts which appear in the different views of the drawings will be identified by the same numbers.

Figures 1, 2:
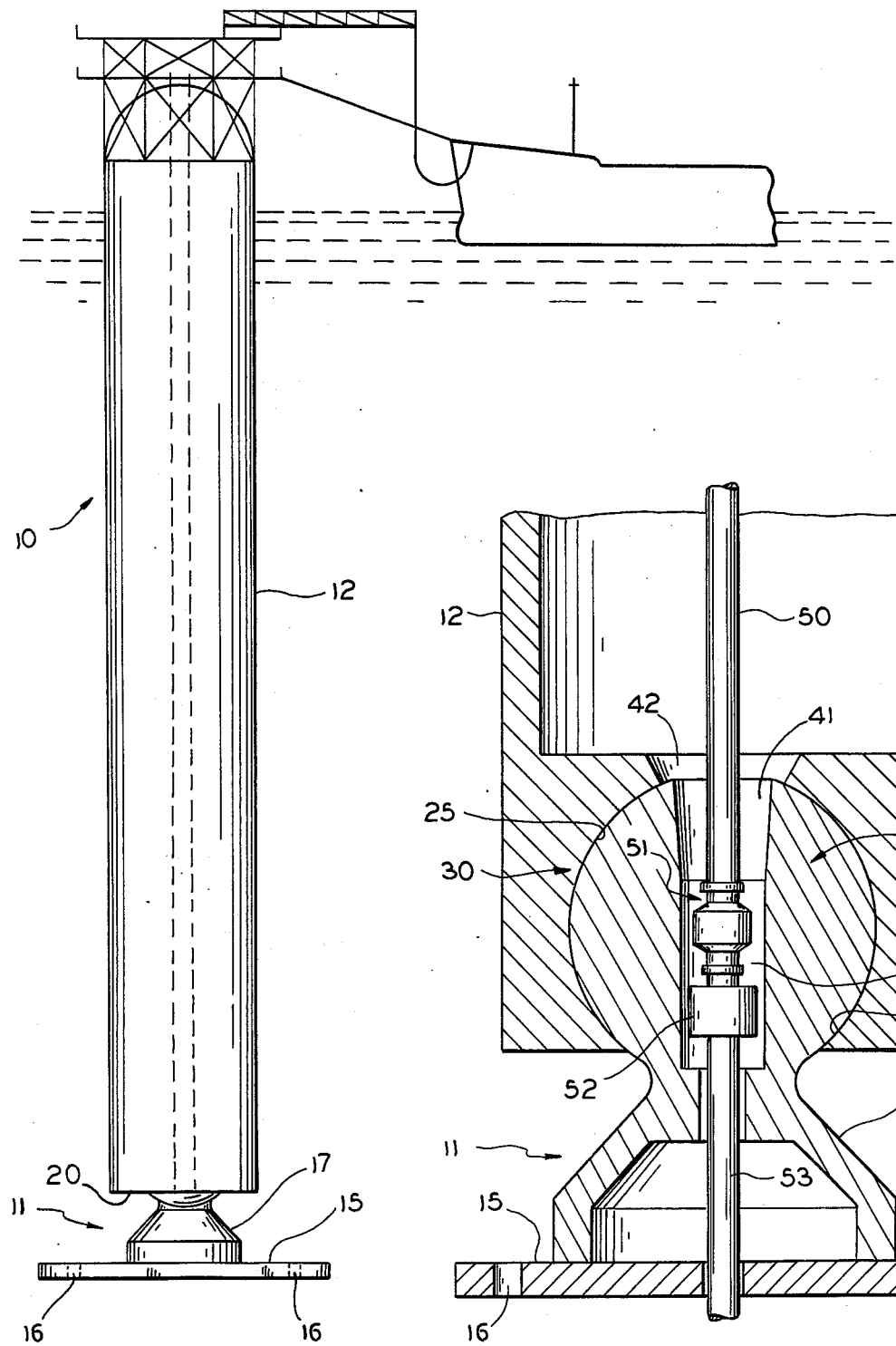
FIG. 1 is an elevational view of an offshore structure having a ball and socket joint between a base on the sea floor and the bottom of the tower arranged so that the tower can rotate freely about a vertical axis.
FIG. 2 is a vertical sectional view of the tower and base of FIG. 1 and shows a ball and socket joint supporting the tower, and another ball and socket joint in a fluid pipe or conduit.

With reference to FIGS. 1 and 2, offshore structure 10 has a first element or base 11 at the bottom and a second element or tower 12 supported by the base. Base 11 has a foundation 15 with holes 16 for piles driven into the sea floor. Upwardly projecting member 17, supported by foundation 15, has a ball 20 securely joined to its top. Extending over most of the exterior surface of ball 20 is socket 30 which has an internal spheroidal surface 25 which matches or complements the exterior surface of ball 20, so that there is essentially continuous contact between the ball surface and the internal surface 25 of socket 30. The bottom end of tower 12 is joined to socket 30. Buoyancy chambers, not shown, are provided in the upper part of tower 12 to make it self-righting and to maintain it in a substantially vertical position without the use of guy wires or other supporting means even when it is subjected to heavy seas. The top of the tower 12 extends above sea level and can move horizontally in any direction and it can rotate freely about a vertical axis.

The ball 20 is provided with a vertical axial hole 40 which is enlarged at the top 41. Socket 30 has a hole or opening 42 at the top and this hole is large enough to permit pivotal movement of the tower without the socket touching pipe 50. Of course, if the ball 20 and socket 30 joint were to be used for fluid transport, the hole 42 desirably would be made large enough to permit pivotal movement while maintaining communication therethrough with hole 40 in the ball 20.

As shown in FIG. 2, the pipe 50 is axially and vertically positioned in tower 12. The lower end of pipe 50 is connected to a ball and socket joint 51 which is centrally positioned in ball 20 of the first ball and socket joint. The bottom of the ball and socket joint 51 is joined to a remotely controlled quick connect-disconnect fitting 52 from which pipe 53 extends downwardly through an opening in base 15 into an oil well.

The ball and socket joint 51, as shown in FIG. 3, has a ball 60 joined to a pipe fitting element 61. Hole 62 extends axially vertically through ball 60 and pipe fitting element 61. Socket 70 fits over ball 60 in nesting arrangement and is joined to pipe fitting element 71. Hole 72 extends through socket 70 and pipe fitting element 71. The holes 62 and 72 together provide a fluid flow conduit. Seals 67 can be placed in the socket 70, and/or seals 68 can be placed in the ball 60, to make the joint 51 essentially fluid tight.

As shown in FIGS. 3 and 4, the ball 60 has two diametrically opposing and longitudinally positioned slots 64. Each slot is positioned vertically and has equally spaced apart parallel walls. The slots 64 are positioned to be approximately one-half above and one-half below the equator of the ball 60. The slots are rounded at the top and bottom to accommodate the circular rollers which fit in the slots.

FIG. 3 illustrates the positioning of the two cam followers 166. Each of the cam followers 166 is positioned at the equator of the spheroidal socket internal surface 69. Each cam follower 166 has an axle 65 secured in fixed arrangement to the socket 70. Mounted on the end of each axle 65 is a roller 66 with a crown surface. The roller 66 is mounted on suitable bearings so that it rolls freely on the end of axle 65. The diameter of roller 66 is slightly smaller than the width of slot 64 in which it rolls freely during movement of the tower.

The described cam follower-slot mechanism used in the ball and socket joint 51 at the bottom of pipe 50 permits the pipe to pivot about the axes X and Y as shown in FIG. 5. The axes X and Y are in a horizontal plane and they intersect perpendicularly at the point Z. The pipe 50, however, is restrained from vertical rotation about the axis V, shown in FIG. 5, because of the torque transmitting mechanism made up of the cam followers 166 and the slots 64. Any torque transmitted by pipe 50 is transmitted to pipe 53. If pipe 53 is prevented from rotating, then pipe 50 will not rotate. Of course, pipe 50 will rotate if pipe 53 is not restrained against rotation.

Another embodiment of the invention is illustrated by FIG. 6. In this embodiment, ball 80 has a vertical axial hole containing vertical grooves in which nest vertical splines 82 on tubular member 83. The splined connection permits vertical displacement of tubular member 83 in ball 80. Ball 80 fits in socket 85 at the end of support member 86. The ball 80 is provided with two slots 64 as previously described and two cam followers 66 as previously described are mounted in the socket 85 to cooperate with the slots to provide torque transfer capability to the ball and socket joint.

The foregoing detailed description has been given for clearness of understanding only, and no unnecessary limitations should be understood therefrom, as modifications will be obvious to those skilled in the art.

What is claimed is:

1. In combination:
a ball joined to a first element,
a hole through the ball and first element,
a socket, having a spheroidal internal surface, joined to a second element,
a hole through the socket and second element,
said socket containing the ball in mating and nesting arrangement with the hole in the ball communicating with the hole in the socket,
one of the ball and the socket containing at least one cam slot extending along a line of longitude,
a cam follower having an axle joined to one of the ball and the socket at the equator and extending into the slot in the other one,
said ball and socket being rotatable relative to each other around only two of three orthogonal axes intersecting at a point in the radial center of the ball,
the ball and socket being centrally and radially positioned in a second ball and socket joint, said second ball and socket joint comprising:
a ball joined to a first element,
a hole through the ball and first element,
a socket, having a spheroidal internal surface, joined to a second element,
a hole through the socket and second element, said socket containing the ball in mating and nesting arrangement with the hole in the ball communicating with the hole in the socket, and
said ball and socket being rotatable relative to each other around three orthogonal axes intersecting at a point in the radial center of the ball.

2. In combination:
a ball slidably joined axially to a first element by a splined connection,
a hole through the ball and first element,
a socket, having a spheroidal internal surface, joined to a second element,
a hole through the socket and second element,
said socket containing the ball in mating and nesting arrangement with the hole in the ball communicating with the hole in the socket,
one of the ball and the socket containing at least one cam slot extending along a line of longitude,
a cam follower having an axle joined to one of the ball and the socket at the equator and extending into the slot in the other one,
said ball and socket being rotatable relative to each other around only two of three orthogonal axes intersecting at a point in the radial center of the ball,
the ball and socket being centrally and radially positioned in a second ball and socket joint, said second ball and socket joint comprising:
a ball joined to a first element,
a hole through the ball and first element,
a socket, having a spheroidal internal surface, joined to a second element,
a hole through the socket and second element,
said socket containing the ball in mating and nesting arrangement with the hole in the ball communicating with the hole in the socket, and
said ball and socket being rotatable relative to each other around three orthogonal axes intersecting at a point in the radial center of the ball.

3. In combination:
a ball joined to a first element,
a hole through the ball and first element,
a socket, having a spheroidal internal surface, joined to a second element,
a hole through the socket and second element,
said socket containing the ball in mating and nesting arrangement with the hole in the ball communicating with the hole in the socket,
one of the ball and the socket containing at least one cam slot extending along a line of longitude,
a cam follower having an axle joined to one of the ball and the socket at the equator and extending into the slot in the other one, and
said ball and socket being rotatable relative to each other around only two of three orthogonal axes intersecting at a point in the radial center of the ball,
the ball and socket being centrally and radially positioned in a second ball and socket joint, said second ball and socket joint comprising:
a ball joined to a first element,
a hole through the ball and first element,
a socket, having a spheroidal internal surface, joined to a second element,
a hole through the socket and second element,
said socket containing the ball in mating and nesting arrangement with the hole in the ball communicating with the hole in the socket, and
said ball and socket being rotatable relative to each other around three orthogonal axes intersecting at a point in the radial center of the ball,
one of the first and second elements of the second ball and socket joint being a base adapted to rest on a sea floor, and the other of the first and second elements being an elongated buoyant tower intended to extend above sea level at an offshore location.

4. In combination:
a ball slidably joined axially to a first element by a splined connection,
a hole through the ball and first element,
a socket, having a spheroidal internal surface, joined to a second element,
a hole through the socket and second element,
said socket containing the ball in mating and nesting arrangement with the hole in the ball communicating with the hole in the socket,
one of the ball and the socket containing at least one cam slot extending along a line of longitude,
a cam follower having an axle joined to one of the ball and the socket at the equator and extending into the slot in the other one, said ball and socket being rotatable relative to each other around only two of three orthogonal axes intersecting at a point in the radial center of the ball, the ball and socket being centrally and radially positioned in a second ball and socket joint, said second ball and socket joint comprising:

a ball joined to a first element, a hole through the ball and first element, a socket, having a spheroidal internal surface, joined to a second element, a hole through the socket and second element, said socket containing the ball in mating and nesting arrangement with the hole in the ball communicating with the hole in the socket, and said ball and socket being rotatable relative to each other around three orthogonal axes intersecting at a point in the radial center of the ball, one of the first and second elements of the second ball and socket joint being a base adapted to rest on a sea floor, and the other of the first and second elements being an elongated buoyant tower intended to extend above sea level at an offshore location.

5. A combination according to claim 3 in which the tower is rotatable about two axes in a horizontal plane.

6. A combination according to claim 4 in which the tower is rotatable about two axes in a horizontal plane.

7. A combination according to claim 1 in which one of the first and second elements of the first ball and socket joint is joined to a remotely controlled quick connect-disconnect fitting for joining to a pipe.

8. A combination according to claim 2 in which one of the first and second elements of the first ball and socket joint is joined to a remotely controlled quick connect-disconnect fitting for joining to a pipe.

9. In combination:

a ball joined to a first element, a hole through the ball and first element, a socket, having a spheroidal internal surface, joined to a second element, a hole through the socket and second element, said socket containing the ball in mating and nesting arrangement with the hole in the ball communicating with the hole in the socket, one of the ball and the socket containing at least one cam slot extending along a line of longitude, a cam follower having an axle joined to one of the ball and the socket at the equator and extending into the slot in the other one, the axle having a roller thereon with a crown surface having a diameter slightly smaller than the slot width, but contacting the slot walls during movement of the roller in the slot, and said ball and socket being rotatable relative to each other around only two of three orthogonal axes intersecting at a point in the radial center of the ball.

10. In combination:

a ball slidably joined axially to a first element by a splined connection, a hole through the ball and first element, a socket, having a spheroidal internal surface, joined to a second element, a hole through the socket and second element, said socket containing the ball in mating and nesting arrangement with the hole in the ball communicating with the hole in the socket, one of the ball and the socket containing at least one cam slot extending along a line of longitude, a cam follower having an axle joined to one of the ball and the socket at the equator and extending into the slot in the other one, and said ball and socket being rotatable relative to each other around only two of three orthogonal axes intersecting at a point in the radial center of the ball.

* * * * *